US008214567B2

(12) United States Patent
Wu et al.

(10) Patent No.: US 8,214,567 B2
(45) Date of Patent: Jul. 3, 2012

(54) OPTICAL DATA STORAGE DRIVE DEVICE FOR MULTIMEDIA AUDIO/VIDEO SYSTEM

(75) Inventors: Kuo Chuan Wu, Taipei (TW); Tun Jen Chen, Taipei (TW); Chin Chuang Hsiao, Tucheng (TW); Shin Shin Chu, Banciao (TW)

(73) Assignee: Nosica International Co., Neihu District, Taipei (TW)

( * ) Notice: Subject to any disclaimer, the term of this patent is extended or adjusted under 35 U.S.C. 154(b) by 605 days.

(21) Appl. No.: 10/828,917

(22) Filed: Apr. 21, 2004

(65) Prior Publication Data
US 2005/0124342 A1 Jun. 9, 2005

(30) Foreign Application Priority Data

Dec. 4, 2003 (TW) .............................. 92134254 A

(51) Int. Cl.
 G06F 13/12 (2006.01)
(52) U.S. Cl. ............... 710/72; 710/74; 710/62; 725/153
(58) Field of Classification Search .............. 710/72, 710/62, 74; 725/153
See application file for complete search history.

(56) References Cited

U.S. PATENT DOCUMENTS

| 5,794,164 | A  | * | 8/1998  | Beckert et al. | 455/3.06 |
| 5,910,933 | A  | * | 6/1999  | Moore | 369/2 |
| 6,006,285 | A  | * | 12/1999 | Jacobs et al. | 710/14 |
| 6,088,809 | A  | * | 7/2000  | Atkinson | 713/324 |
| 6,356,968 | B1 | * | 3/2002  | Kishon | 710/306 |
| 6,414,675 | B1 | * | 7/2002  | Shen | 345/211 |
| 6,522,419 | B1 | * | 2/2003  | Ko | 358/1.15 |
| 6,654,827 | B2 | * | 11/2003 | Zhang et al. | 710/62 |
| 6,675,233 | B1 | * | 1/2004  | Du et al. | 710/14 |
| 6,704,811 | B2 | * | 3/2004  | Jacobs et al. | 710/14 |

(Continued)

FOREIGN PATENT DOCUMENTS

EP 0756278 A2 1/1997

(Continued)

OTHER PUBLICATIONS http://www.pcstats.com/articleview.cfm?articleID=1488, M. Page, PCSTATS.COM, "*Gigabyte M1600A Multimedia DVD-ROM Review*" Nov. 2003.

(Continued)

*Primary Examiner* — Chun-Kuan Lee
*Assistant Examiner* — Ernest Unelus
(74) *Attorney, Agent, or Firm* — Bui Garcia-Zamor; Hung H. Bui, Esq.

(57) ABSTRACT

The invention relates to a versatile optical storage driving device for multimedia video system incorporated with functions of a compact-disc (CD) driver, a digital versatile disc (DVD) driver, a frequency modulated (FM) radio and a MP3 music CD player, such versatile optical storage driving device is characterized in the possibility of being a built-in and/or external-connected CD-ROM/CD-RW driver operated through the operating system with personal computer (PC) on or being a stand-alone CD-ROM/CD-RW driver operated by itself with PC off, and being a digital picture viewer and video player capable of displaying photograph/picture and video disc through a built-in/external-connected display device as well as being a digital recorder capable of recording video signal, such device comprises: a video/audio input/output selector; a video/audio encoder/decoder; a microprocessor; a optical storage device; a memory card reader; a display controller; a status display; a power amplifier; and a speaker.

24 Claims, 4 Drawing Sheets

U.S. PATENT DOCUMENTS

| | | | |
|---|---|---|---|
| 6,954,804 B2 * | 10/2005 | Lam et al. | 710/14 |
| 7,260,318 B2 * | 8/2007 | Wang et al. | 386/126 |
| 2002/0012531 A1 * | 1/2002 | Flannery | 386/126 |
| 2002/0126703 A1 * | 9/2002 | Kovacevic | 370/487 |
| 2002/0178390 A1 * | 11/2002 | Lee | 713/320 |
| 2003/0210900 A1 * | 11/2003 | Flannery et al. | 386/125 |
| 2004/0133716 A1 * | 7/2004 | Lee | 710/72 |
| 2004/0186935 A1 * | 9/2004 | Bell et al. | 710/72 |
| 2004/0194154 A1 * | 9/2004 | Meadors et al. | 725/153 |
| 2005/0088931 A1 * | 4/2005 | Takeuchi et al. | 369/44.29 |
| 2006/0101175 A1 * | 5/2006 | Du et al. | 710/62 |

FOREIGN PATENT DOCUMENTS

| | | |
|---|---|---|
| EP | 1117030 A2 | 7/2001 |
| GB | 2395818 A | 6/2004 |
| TW | 92129900 | 10/2003 |
| WO | 01/33569 A1 | 5/2001 |

OTHER PUBLICATIONS http://www.homecinemachoice.com/cgi-bin/displayreview.php?reviewid=3409, M. Pipe, HOMECINEMACHOICE.COM, "*Ramming It Home*" Oct. 2003.

http://www.rdvdc.org/english/press/topics/ces2003_pdf/ces_3.pdf, G. Belloni, S. Curley, RDVDC.ORG "*Hitachi DVD Camcorders Focus on Portability and Performance*" Jan. 2003.

http://www.steves-digicams.com/2003_reviews/hp7960.html, Steve'S Digicams, XP002296906, "*HP Photosmart 7960*" Aug. 2003.

Search Report of corresponding Dutch Application.
Search Report of corresponding French Application.
Search Report of corresponding UK Application.

* cited by examiner

OPTICAL DATA STORAGE DRIVE DEVICE FOR MULTIMEDIA AUDIO/VIDEO SYSTEM

BACKGROUND

1. Field of the Invention

The invention relates to a versatile optical storage driving device for multimedia audio/video system incorporated with functions of a compact-disc driver (CD), a digital versatile disc (DVD), a frequency modulated (FM) radio and a MP3 music CD player, especially to a versatile optical storage driving device characterized in that it is possible to be used as a built-in and/or external-connected CD-ROM/CD-RW driver operated through the operation system of PC with PC on, or as an independent CD-ROM/CD-RW driver operated by itself with PC off, and as a digital picture viewer and audio/video player capable of displaying photograph/picture and audio/video disc through a built-in/external-connected display device as well as a digital recorder capable of recording audio/video signal.

2. Related Art of the Invention

Generally, the CD (i.e., optical storage means) driver installed in systems such as desktop personal computer (PC), notebook PC, tablet PC and Macintosh PC is a storage device used to read/write information in an optical manner. In fact, the CD driver is the most important technology developed in the field of data storage since the invention of the magnetic diskette driver. Such technology has combined the advantages of having huge storage capacity as the high-density magnetic tape, capable of performing fast random access and fast searching, the long-term preservation of data stored therein and capable of storing information at low cost. With high precision, such technology has already profoundly applied to various industrial divisions such as television, stereo system, image storage and data processing.

Currently, the personal computer (PC) has become the popular personal data processing device while the CD driver has played an important role in the PC. However, when the PC is not in use, the CD driver installed therein is also left unused. It is rather inconvenient that one have to add a DVD driver in order to read the contents of a digital versatile disc, to use a radio to listen to the broadcast of a frequency modulated radio station, and to turn on the computer in order to receive and play the sound music of a MP3 musical CD.

Therefore, the inventor has disclosed in R.O.C. patent application no. 92129900 filed on Oct. 28, 2003, a device on one hand capable of achieving the effect of space consuming, increased convenience, and low cost without the operation system of the PC, while on the other hand capable of monolithically integrating in a single device a CD driver for playing audio/video compact disc, a DVD driver for playing digital versatile disc, a frequency modulated radio for receiving frequency modulated music, and an CD player of MP3 music for playing music stored thereon.

However, after the research and market survey, it is found to be necessary for the device disclosed in the patent application no. 92129900 being a stand-alone type that can be moved freely like a household electric appliance operated in both AC and DC (convenient for outdoor use) power supply, for example, it is preferable for such device to have functions of Hi-Fi stereo amplifier, audio/video signal recording, photograph/picture displaying/storing, while easily working as a television or projector through a built-in/externally connected display.

SUMMARY OF THE INVENTION

Therefore, an object of the present invention is to provide a versatile optical storage driving device for multimedia audio/video system incorporated with functions of a compact-disc (CD) driver, a digital versatile disc (DVD) driver, a frequency modulated (FM) radio and a MP3 music CD player, such versatile optical storage driving device is characterized in the possibility of being a built-in and/or external-connected CD-ROM/CD-RW driver operated through the operation system with PC on or being a stand-alone CD-ROM/CD-RW driver operated by itself with PC off, and being a digital picture viewer and video player capable of displaying photograph/picture and audio/video disc through a built-in/external-connected display device as well as being a digital recorder capable of recording audio/video signal.

To achieve the above object, a versatile optical storage driving device for multimedia audio/video system is provided in accordance with one aspect of the present invention, with a CD driver, a picture viewer, a DVD driver, a digital video recorder (DVR), a FM radio and a MP3 music CD player monolithically integrated in a single device comprising: a video/audio input/output selector, connected to a built-in/external device for inputting/outputting video/audio signal; a video/audio encoder/decoder, for encoding input video/audio signal before storing and for decoding stored video/audio signal before outputting to the built-in/external device through the video/audio input/output selector; a microprocessor, for controlling the operation of the optical storage device/memory card reader in accordance with a key-in or pre-stored instruction and the read/write of the BIOS data of a computer's mother board; an optical storage device, for reading/writing the encoded video/audio signal and data from the microprocessor through a bus switch; a memory card reader, for reading/writing the encoded video/audio signal and data from the microprocessor through the bus switch connected to the microprocessor; a display controller, connected to the microprocessor for controlling the display of a status display; a status display, for displaying operation status of the memory card reader, the personal computer and the optical storage driving device; a power amplifier, connected to the video/audio encoder/decoder for amplifying the input signal and decoded output audio signal; and a speaker, connected to the power amplifier for outputting the amplified audio signal.

In another aspect, the versatile optical storage driving device for multimedia audio/video system further comprises a power-on detector, connected to a power supply on PC and a bus switch, for determining the power-on status of the PC, the microprocessor controls the bus switch to release and standard interface between the PC and the optical storage driving device so as to conduct operation without the operating system (OS) of PC when PC is off, while once a PC power-on status is detected, the microprocessor controls said bus switch to resume the function of the standard interface so as to operate the optical storage driving device through the PC.

In still another aspect of the present invention, the optical storage driving device is of stand-alone type. In yet another aspect of the present invention, the optical storage driving device is of portable type. In further aspect of the present invention, the optical storage driving device can be built-in to a personal computer or externally connected thereto. In still further aspect of the present invention, the built-in/external device can be a video/audio signal providing device and a video/audio signal player such as television, projector, plasma display panel, liquid crystal display and monitor of a personal computer. In yet further aspect of the present invention, the optical storage device includes such as CD-ROM, CD-R, CD-RW, DVD-ROM, DVD-R, DVD-RW, DVD+R, DVD+RW and DVD-RAM servers.

In furthermore aspect of the present invention, the status display includes one of the vacuum fluorescent display (VFD) and the liquid crystal display (LCD). In still furthermore aspect of the present invention, the display is used to display the mode selection, adjustment controlling, and status indicator of these functions.

In yet furthermore aspect of present invention, the personal computer includes one of a desktop personal computer, notebook personal computer, tablet personal computer and Macintosh computer. In still other aspect of the present invention, the standard interface can be one of the ATAPI-IDE, the serial ATA or SCSI, the USB 1.1/2.0 built-in or externally connected to a personal computer and a IEEE 1394 standard interface.

In yet other aspect of the present invention, the power-on detector is used to detect the voltage on the power supply unit of a personal computer or to detect the computer's host reset signal (HRST) on the connecting bus between the personal computer and the panel controller so as to confirm the on status of the power supply.

The versatile optical storage driving device of the present invention further comprises a connecting device, equipped with a power connector, a CD analogue audio output connector and a Sony-Phillips digital interface (SPDIF) output connector, while the connecting device has a dominating bus and an input/output bus so as to increase the expandability of the optical storage driving device.

BRIEF DESCRIPTION OF DRAWINGS

The above and other objects, features, and advantages of the present invention will become more apparent from the detailed description in conjunction with the following drawings.

DETAILED DESCRIPTION OF THE INVENTION

Figure 1:
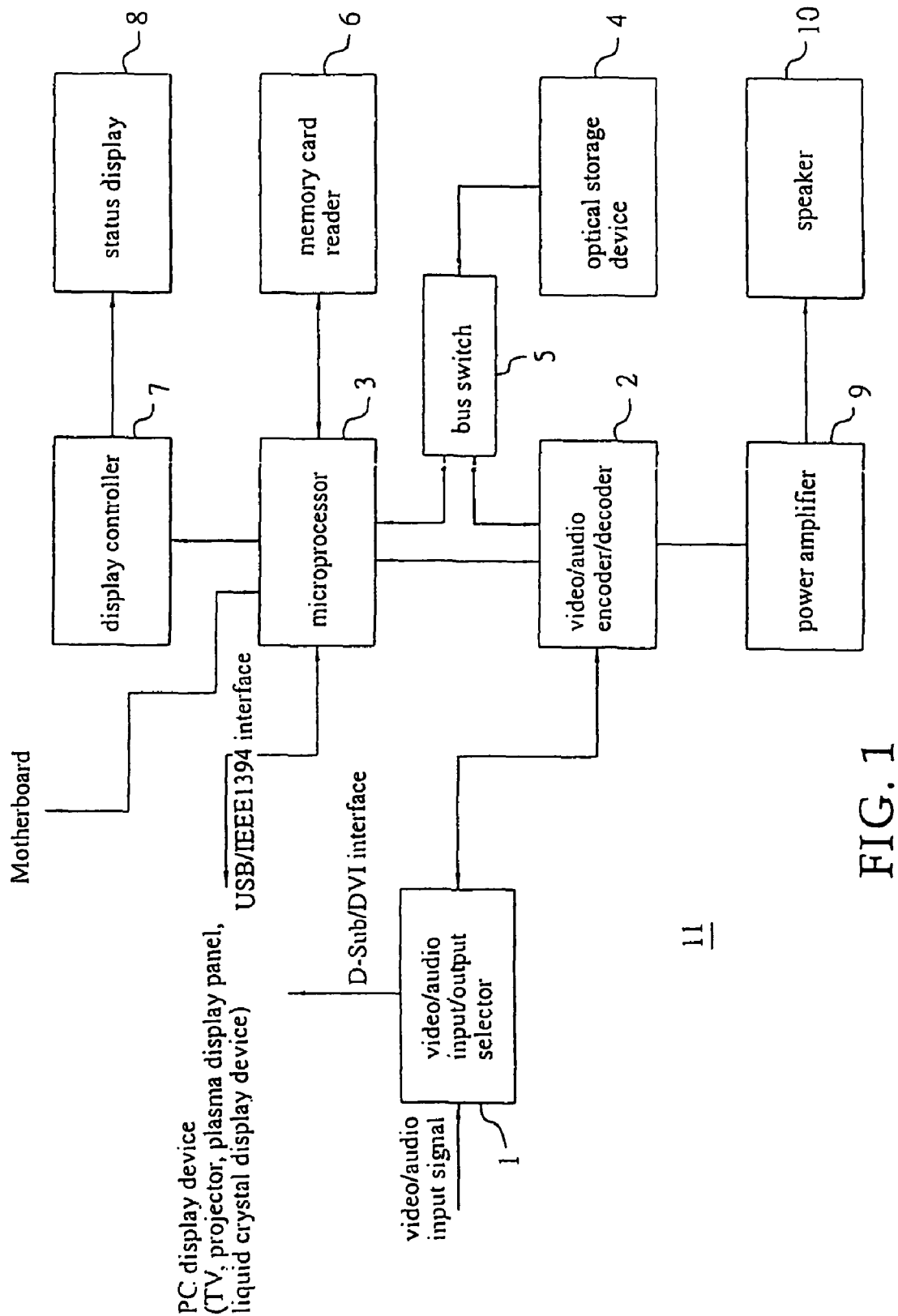
FIG. 1 is a schematic view showing an optical storage driving device in accordance with a preferred embodiment of the present invention.

Referring to FIG. 1, a schematic structure of an optical storage driving device in accordance with a preferred embodiment of the present invention is shown. In FIG. 1, a versatile optical storage driving device 11 for multimedia audio/video system comprises: a video/audio input/output selector 1, for inputting video/audio signals such as video/audio signal of TV tuner, composite video signal and audio signal coming from a external device (not shown) and for outputting video/audio signals to external devices such as monitor of PC and TV; a video/audio encoder/decoder 2, connected to the video/audio input/output selector 1 for encoding input video/audio signal before storing and for decoding stored video/audio signal before outputting to said external device (i.e., outputting via a D-Sub/DVI interface to a PC) through the video/audio input/output selector 1; a microprocessor 3, for controlling the operation of the optical storage device in accordance with a key-in or pre-stored instruction, as shown in FIG. 1, where the microprocessor 3 is possible to input/output data indirectly from a computer device such as PC, through an USB/IEEE interface connector, or directly from the video/audio encoder/decoder 2; an optical storage device 4, for storing the encoded video/audio signal and data coming from the microprocessor through a bus switch 5, the optical storage device 4 is not restricted to an optical storage device server like DVD-ROM server but expandable to cover other optical storage device servers such as CD-ROM, CD-R, CD-RW, DVD-ROM, DVD-R, DVD-RW, DVD+R, DVD+RW and DVD-RAM servers, where the connecting interface of the optical storage device 4 can be, but not restricted to, a ATAPI-IDE (AT Attachment Pocket Interface-Integrated Dual Enhancement) interface or a SCSI (Small Computer System Interface) interface connector, and it can also be a serial ATA interface connector, moreover, as described on above, the versatile optical storage driving device 11 of the present invention can be connected to an external PC via an USB/IEEE interface connectors such as USB 1.1/2.0 and IEEE 1394; a memory card reader 6, connected to the microprocessor for reading/writing the encoded video/audio signal and data coming from the microprocessor; a display controller 7, connected to the microprocessor for controlling the display of a status display; a status display 8, for displaying the operation status of the memory card reader, the optical storage device 11 and the BIOS of the personal computer, for example the status display 8 can be a vacuum fluorescent display (VFD) or a liquid crystal display (LCD); a power amplifier 9, connected to the video/audio encoder/decoder 2 for amplifying the input signal and decoded output audio signal; and a speaker 10, connected to the power amplifier for outputting the amplified audio signal.

As described above, the connecting interface of the optical storage driving device 11 can be an ATAPI-IDE interface, a serial ATA interface or a SCSI interface capable of conducting self-detection on whether a bus line is inserted or not, so that it is possible to automatically or manually link the optical storage driving device 11 to a computer or other device after a bus line is inserted. Therefore, since the optical storage driving device 11 of the present invention has been equipped with interfaces such as an ATAPI-IDE interface, a serial ATA interface or a SCSI interface, USB 1.1/2.0 and IEEE 1394, therefore the optical storage driving device 11 can be used as a built-in or external device connected to personal computers such as a desktop PC, a notebook PC or tablet PC.

Figure 2:
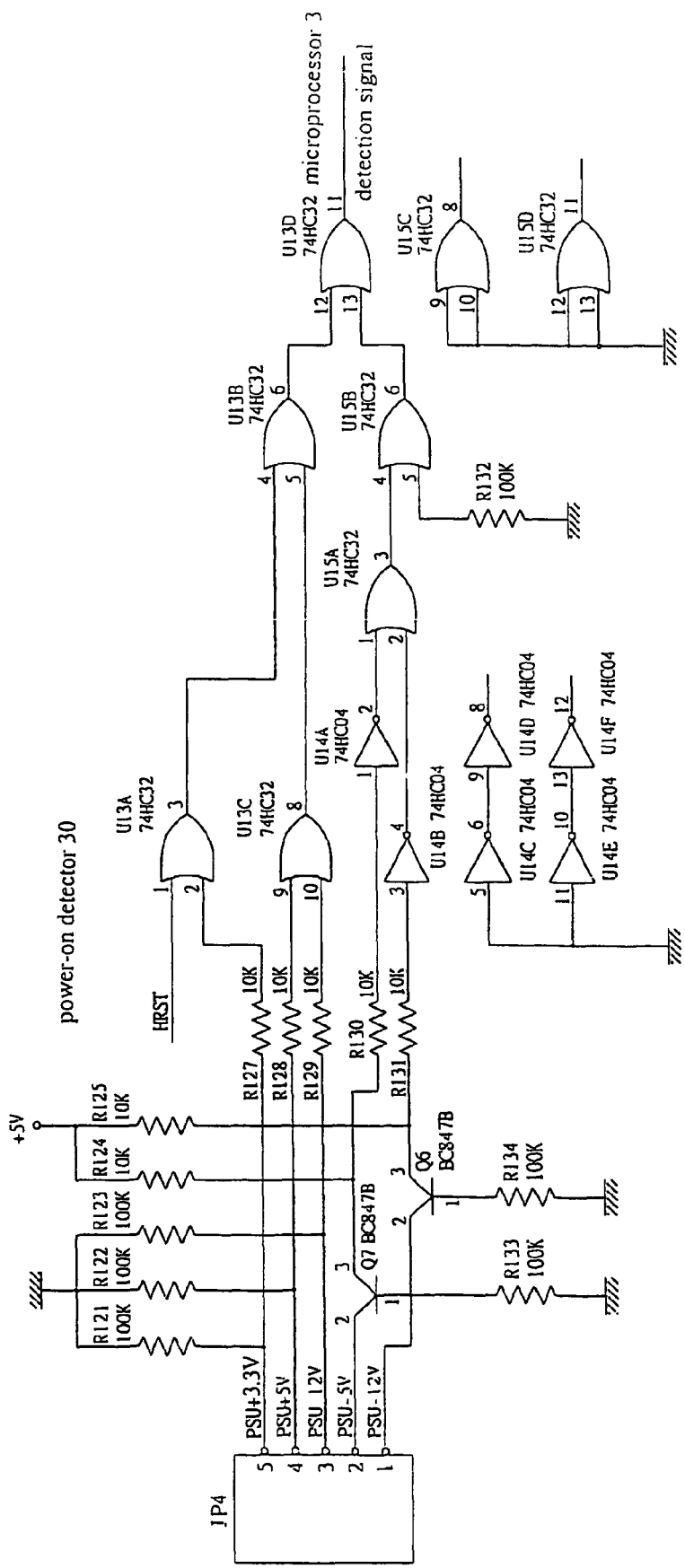
FIG. 2 is a circuit diagram showing the structure of a power-on detector of the optical storage driving device in accordance with the preferred embodiment of the present invention.

FIG. 2 is a circuit diagram showing the structure of a power-on detector 30 of the optical storage driving device in accordance with the embodiment of the present invention. In general, being incorporated in the microprocessor, the power-on detector 30 is connected to the power supply of an external PC to detect the existence of the working voltage of PC and is connected to the ATAPI-IDE interface of PC to detect the existence of HRST, the PC is in power-on status if one of the above signal is detected while in power-off status if none of the above signal is detected. When PC is power-on, the power-on detector 30 sends a detection signal to the microprocessor 3 for controlling the on/off operation of the bus switch 5.

Figure 3A:
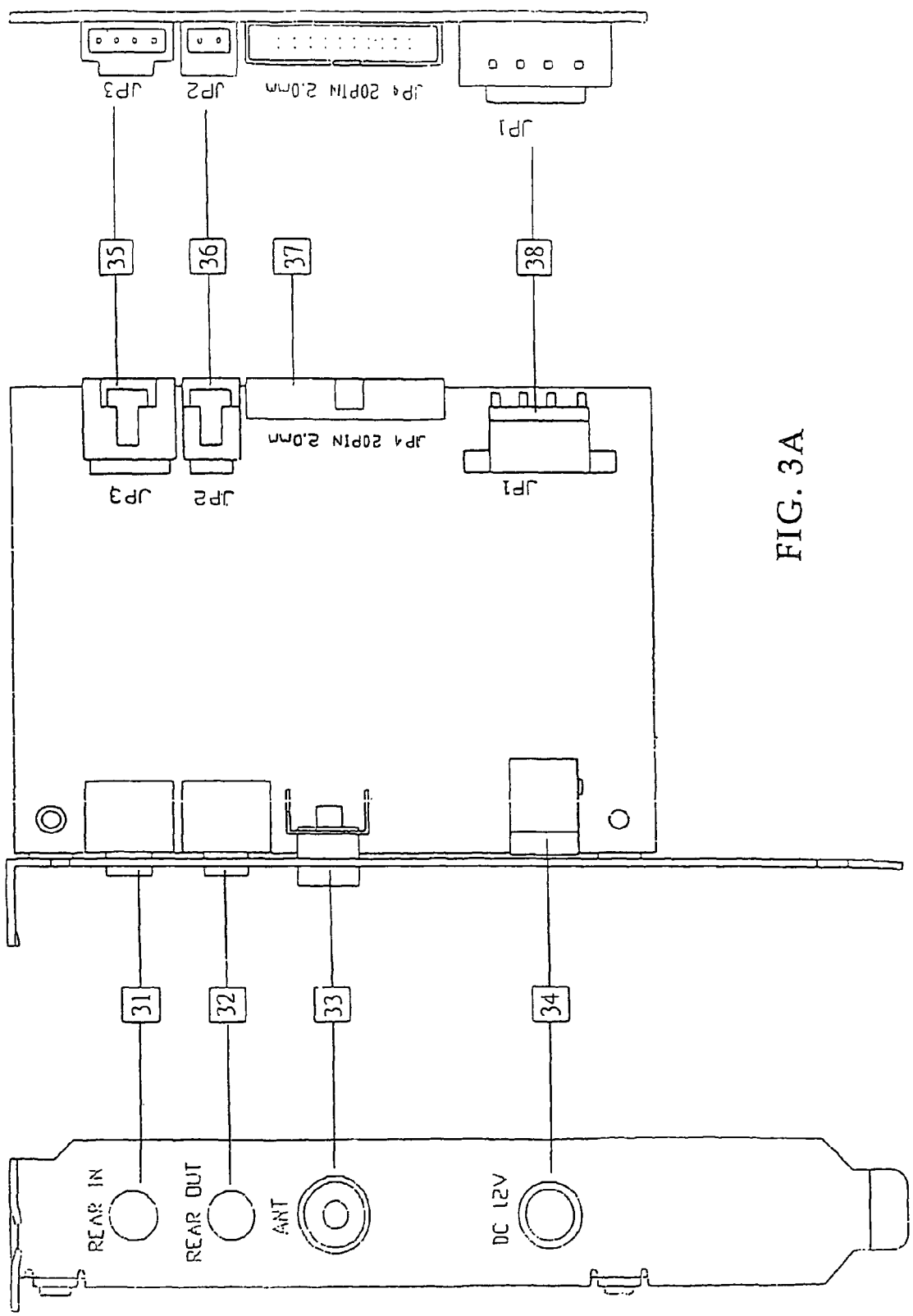
FIGS. 3A and 3B are diagrams showing the structure of a connecting device of the optical storage driving device in accordance with the preferred embodiment of the present invention.
Figure 3B:
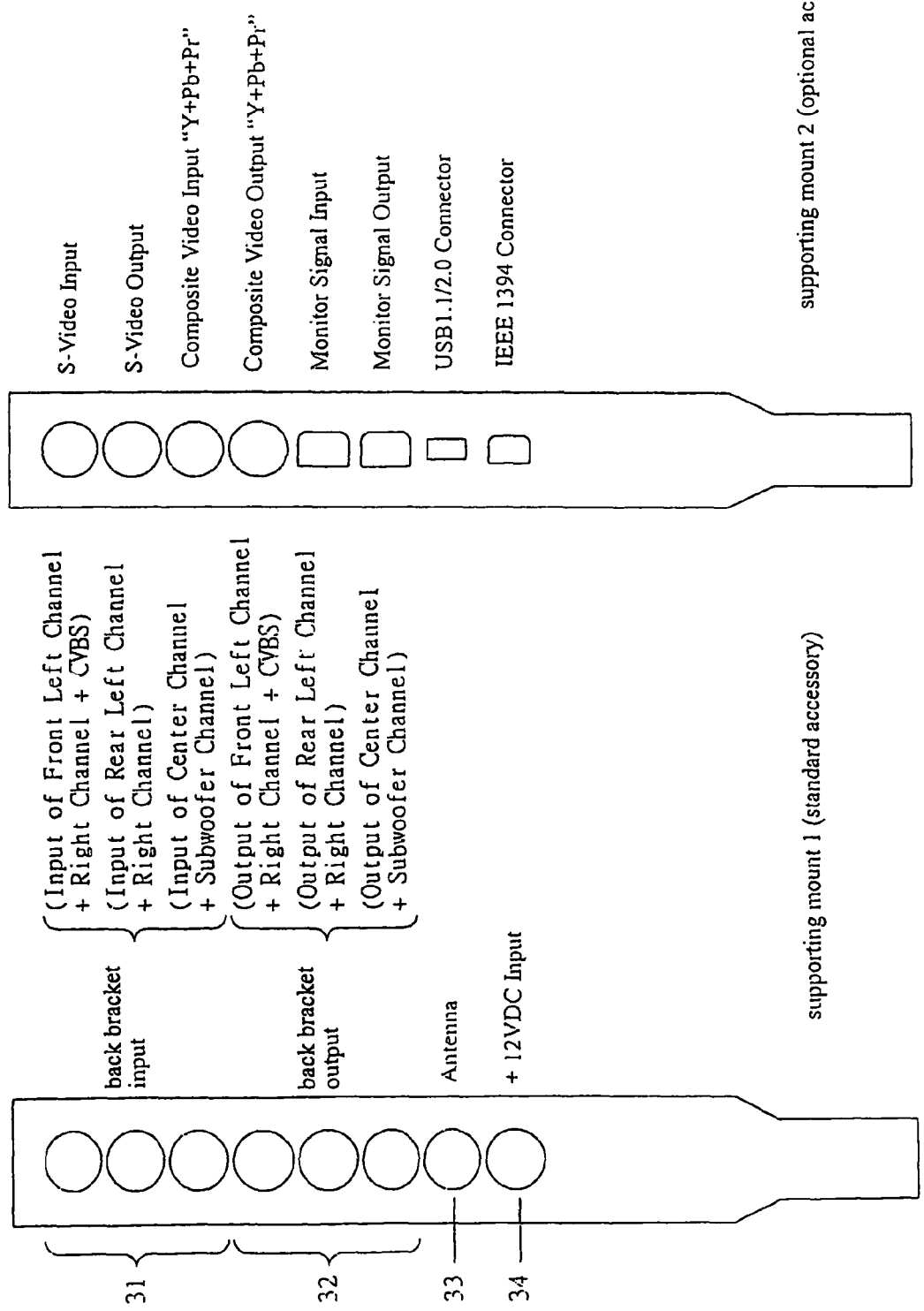

Referring to FIGS. 3A and 3B, a connecting device of the optical storage driving device in accordance with the embodiment of the present invention is schematically described. In FIG. 3A, there is a diagram showing the structure of a connecting device of the optical storage driving device in accordance with the embodiment of present invention, wherein the optical storage driving device is monolithically integrated in a single device the functions of a CD, a picture viewer, a DVD, a DVR, a FM radio and a MP3 musical CD player. The connecting device includes a power-on detector 38, an analogue audio output connector of optical storage driving device 35 and a SPDIF-type output connector 36, and the connecting device is characterized in a dominator connector 37 having a dominating bus and an input/output bus in order to increase the expandability of the optical storage driving device.

In FIG. 3A, an embodiment of the connecting board connected to PC is shown, on the left side of said connecting board is provided with a power connector 38, an analogue audio output connector of optical storage driving device 35 and SPDIF-type output connector 36 as well as a Dominator connector 37 with a dominating bus and a input/output bus (not shown); while on the right side of said connecting board is provided with a back bracket input 31, a back bracket input 32, an FM antenna 33 and a 12-volt DC input 34. In the central portion of FIG. 3A, the cross section of the connecting device of the optical storage driving device is shown, while in the far left side and the far right side of FIG. 3A, a plane view showing the supporting mount and the connector of the connecting device are shown, respectively.

In FIG. 3B, another embodiment of the connecting board connected to PC is shown, on the left hand side a standard accessory, i.e. a supporting mount, opposite to the supporting mount in FIG. 3A is provided, and on the right hand side of the figure an optional supporting mount is provided, in which same reference number is used to indicate like parts in different figures.

Further, besides the above described function for optical storage device, the optical storage driving device 11 of the present invention is further integrated therein a complicate functions of mini Hi-Fi stereo system, digital picture viewer and digital video player/recorder, so that the user of a PC not only enjoy the performance of a optical storage device but also the joy came from photograph as well as digital video signal without an extra set of space consuming stereo, DVD player and a DVR, in another word, greatly increase the additional value of the optical storage device.

Furthermore, the stereo system, digital picture viewer and digital recorder/player of the optical storage driving device can be a stand-alone device requires no interface to computer but operates like an ordinary household consumer electrical appliance. With such stand-alone device, one may listen to CD, MP3 and FM radio, watching digital photograph and digital video program, storing picture files and recording video signals without making use the CPU resources of a PC.

However, above described are preferred embodiments of the invention but not intended to be the limit of the invention, various change and modification without departing from the claim must be considered as fall within the scope of the invention. For instance, the optical storage device refers to well known compact disc drive including CD-DA (digital audio CD), VCD (video CD), and SVCD (super VCD), DVD and digital video recorder; said IEEE 1394 interface includes IEEE 1394a and IEEE 1394b for transmission rate of 400 MB/sec and 800 MB/sec, respectively.

DESCRIPTION OF SYMBOL

Numeral Description
  1 video/audio input/output selector
  2 video/audio enconder/deconder
  3 microprocessor
  4 optical storage device
  5 bus switch
  6 memory card reader
  7 display controller
  8 status display
  9 power amplifier
  10 speaker
  11 optical storage driving device
  30 power-on detector
  31 back bracket input
  32 back bracket output
  33 antenna of frequency modulated radio (FM antenna)
  34 DC input
  35 analogue audio output connector of optical storage driving device
  36 SPDIF-type output connector
  37 dominator connector
  38 power connector

What is claimed is:

1. An optical storage driving device for use as a built-in or external device to a computer system, utilizing a bus switch to release/resume a standard interface between the computer system and the optical storage driving device, the optical storage driving device comprising:
    a video/audio input/output selector which inputs/outputs video and audio signals;
    a video/audio encoder/decoder which encodes inputted video and audio signals before storing and decodes stored video and audio signals before outputting to the computer system, via said video/audio input/output selector;
    a microprocessor which controls the operation of the optical storage driving device;
    an optical storage device which stores encoded video and audio signals and data from said microprocessor, via said bus switch;
    a memory card reader which reads/writes the encoded video and audio signals and data from said microprocessor;
    a status display which displays an operation status of said memory card reader, said optical storage device and a basis input/output system (BIOS) of the computer system; and
    a power-on detector which detects at least one of a voltage on a main power supply unit of the computer system and a host reset signal (HRST) on the standard interface between the computer system and the optical storage driving device so as to determine whether the computer system is powered "ON" or "OFF";
    wherein, when the power-on detector determines that the computer system is powered "OFF", said microprocessor controls said bus switch to release the standard interface between the computer system and the optical storage driving device so as to process encoded or decoded video and audio signals from said video/audio encoder/decoder and to operate the optical data storage driving device independently from the computer system without booting an operating system (OS) of the computer system, and
    wherein, when the power-on detector determines that the computer system is powered "ON", said microprocessor controls said bus switch to resume functions of the standard interface between the computer system and the optical storage driving device so as to operate the optical storage driving device through the computer system.

2. The optical storage driving device as claimed in claim 1, wherein the power-on detector is incorporated in the microprocessor, and is connected to the main power supply unit of the computer system and the standard interface of the computer system so as to detect the voltage on the main power supply unit of the computer system and the host reset signal (HRST) on the standard interface between the computer system and the optical storage driving device.

3. The optical storage driving device as claimed in claim 2, wherein, when the voltage on the main power supply unit of the computer system or the host reset signal (HRST) on the standard interface between the computer system and the optical storage driving device is detected, the power-on detector determines that the computer system is powered "ON" and generates a detection signal to the microprocessor so as to activate the bus switch to resume the functions of the standard interface between the computer system and the optical storage driving device.

4. The optical storage driving device as claimed in claim 1, wherein, when the power-on detector determines that the computer system is powered "OFF", the optical storage driving device operates as a stand-alone device removable from the computer system to perform functions of at least one of a compact disc (CD) player, a digital audio CD (CD-DA) player, a video CD (VCD) driver, a super VCD (SVCD) driver, a picture viewer, a digital versatile disc (DVD) driver, a digital video recorder (DVR), a frequency modulation (FM) radio, and a digital audio player.

5. The optical storage driving device as claimed in claim 1, wherein the microprocessor controls the operation of the optical storage device and the memory card reader in accordance with key-in or pre-stored instructions and a read/write of BIOS data of the computer system.

6. The optical storage driving device as claimed in claim 1, wherein the optical storage device corresponds to one of a compact disc read-only memory (CD-ROM), compact disc-recordable (CD-R), compact disc-rewritable (CD-RW), digital versatile disc read-only memory (DVD-ROM), digital versatile disc-recordable (DVD-R), digital versatile disc-rewritable (DVD-RW), digital versatile disc recordable-once (DVD+R), digital versatile disc-rewritable plus (DVD+RW) and digital versatile disc random-access-memory (DVD-RAM), and the status display corresponds to one of a vacuum fluorescent display (VFD) and a liquid crystal display (LCD).

7. The optical storage driving device as claimed in claim 1, wherein the inputted video and video signals, via the video/audio input/output selector are originated from one of a television (TV) tuner and an external device, and wherein the computer system corresponds to one of a desktop computer, a notebook computer, and a tablet computer.

8. The optical storage driving device as claimed in claim 1, wherein the standard interface corresponds to one of an ATAPI-IDE (AT Attachment Pocket Interface-Integrated Dual Enhancement) interface, a serial ATA (AT Attachment) interface, a SCSI (Small Computer System Interface) interface, an USB (Universal Serial Bus) Version 1.1/2.0 interface, and an IEEE (Institute of Electrical and Electronics Engineers) 1394 standard interface.

9. The optical storage driving device as claimed in claim 1, further comprising a connecting device equipped with a power connector, a compact disc (CD) analogue audio output connector and a digital interface output connector, and includes a dominating bus and an input/output (IO) bus so as to increase the expandability of the optical storage driving device.

10. The optical storage driving device as claimed in claim 1, further comprising a power supply unit for supplying power to the optical storage driving device separately and independently from the main power supply unit of the computer system so that the optical storage driving device can be powered by direct current (DC) or alternate current (AC) power supply even when the computer system is powered "OFF."

11. The optical storage driving device as claimed in claim 1, further comprising:
    a power amplifier connected to the video/audio encoder/decoder to amplify decoded audio signals; and
    a speaker connected to the power amplifier to output amplified audio signals.

12. The optical storage driving device as claimed in claim 1, wherein the optical storage driving device is of one of stand-alone or portable type and is monolithically integrated in a single device to perform functions of at least one of a compact disc (CD) player, a digital audio CD (CD-DA) player, a video CD (VCD) driver, a super VCD (SVCD) driver, a picture viewer, a digital versatile disc (DVD) driver, a digital video recorder (DVR), a frequency modulation (FM) radio, and a digital audio player.

13. The optical storage driving device as claimed in claim 1, further comprising a power supply unit provided to supply power to the optical storage driving device separately and independently from the main power supply unit of the computer system, and when the power-on detector determines that the computer system is powered "OFF", the optical storage driving device operates as a stand-alone device removable from the computer system to perform functions of one or more high fidelity stereo amplifier, audio/video signal recording, picture displaying and storing, while working as a television or projector, via a built-in/externally connected display.

14. A versatile optical storage driving device having functions of at least one of a compact disc (CD) player, a digital audio CD (CD-DA) player, a video CD (VCD) driver, a super VCD (SVCD) driver, a picture viewer, a digital versatile disc (DVD) driver, a digital video recorder (DVR), a frequency modulation (FM) radio, and a digital audio player monolithically integrated in a single device for use as a built-in or an external device connected to a computer system, and removable from the computer system for operation independently from the computer system, the versatile optical storage driving device comprising:
    a video/audio input/output selector arranged to input video and audio signals;
    a video/audio encoder/decoder arranged to encode input video and audio signals before storage and decodes stored video and audio signals before outputting to the computer system, via the video/audio input/output selector;
    a standard interface arranged to interface with the computer system;
    a bus switch arranged to release/resume functions of the standard interface from/with the computer system;
    a microprocessor arranged to control communication with the computer system, via the standard interface, and to control the operation of the bus switch;
    an optical storage device arranged to store encoded video and audio signals and data from the microprocessor, via the bus switch;
    a memory card reader arranged to read/write the encoded video and audio signals and data from the microprocessor; and
    a power-on detector arranged to detect at least one of a voltage on a power supply unit of the computer system and a host reset signal (HRST) on the standard interface between the computer system and the optical storage driving device so as to determine whether the computer system is powered "ON";
    wherein, when the power-on detector determines that the computer system is not powered "ON", the microprocessor controls the bus switch to release the standard interface between the computer system and the optical storage driving device so as to configure the optical storage driving device to process encoded or decoded video and audio signals from the video/audio encoder/decoder and to operate independently from the computer system without booting an operating system (OS) of the computer system, and wherein, when the power-on detector determines that the computer system is powered "ON", the microprocessor controls the bus switch to resume functions of the standard interface between the computer system and the optical storage driving device so as to configure the optical storage driving device to operate through the computer system.

15. The versatile optical storage driving device as claimed in claim 14, wherein the power-on detector is incorporated in the microprocessor, and is connected to the power supply unit of the computer system and the standard interface of the computer system so as to detect the voltage on the power supply unit of the computer system and the host reset signal (HRST) on the standard interface between the computer system and the optical storage driving device.

16. The optical storage driving device as claimed in claim 14, wherein, when the voltage on the power supply unit of the computer system or the host reset signal (HRST) on the standard interface between the computer system and the optical storage driving device is detected, the power-on detector determines that the computer system is powered "ON" and generates a detection signal to the microprocessor so as to activate the bus switch to resume the functions of the standard interface between the computer system and the optical storage driving device.

17. The optical storage driving device as claimed in claim 14, wherein, when the power-on detector determines that the computer system is not powered "ON", the optical storage driving device operates as a stand-alone device and can be removable from the computer system to perform functions of the compact disc (CD) player, the digital audio CD (CD-DA) player, the video CD (VCD) driver, the super VCD (SVCD) driver, the picture viewer, the digital versatile disc (DVD) driver, the digital video recorder (DVR), the frequency modulation (FM) radio, and the digital audio player.

18. The optical storage driving device as claimed in claim 14, wherein the microprocessor is further configured to control the operation of the optical storage device and the memory card reader in accordance with key-in or pre-stored instructions and a read/write of basis input/output system (BIOS) data of the computer system.

19. The optical storage driving device as claimed in claim 14, wherein the optical storage device corresponds to one of a compact disc read-only memory (CD-ROM), compact disc-recordable (CD-R), compact disc-rewritable (CD-RW), digital versatile disc read-only memory (DVD-ROM), digital versatile disc-recordable (DVD-R), digital versatile disc-rewritable (DVD-RW), digital versatile disc recordable-once (DVD+R), digital versatile disc-rewritable plus (DVD+RW) and digital versatile disc random-access-memory (DVD-RAM), and the status display corresponds to one of a vacuum fluorescent display (VFD) and a liquid crystal display (LCD).

20. The optical storage driving device as claimed in claim 14, wherein the computer system corresponds to one of a desktop computer, a notebook computer, and a tablet computer, and the standard interface corresponds to one of an ATAPI-IDE (AT Attachment Pocket Interface-Integrated Dual Enhancement) interface, a serial ATA (AT Attachment) interface, a SCSI (Small Computer System Interface) interface, an USB (Universal Serial Bus) Version 1.1/2.0 interface, and an IEEE (Institute of Electrical and Electronics Engineers) 1394 standard interface.

21. The optical storage driving device as claimed in claim 14, further comprising a connecting device equipped with a power connector, a compact disc (CD) analogue audio output connector and a digital interface output connector, and includes a dominating bus and an input/output (IO) bus so as to increase the expandability of the optical storage driving device.

22. The optical storage driving device as claimed in claim 14, further comprising a power supply unit disposed independently from the power supply unit of the computer system so that the optical storage driving device can be powered by direct current (DC) or alternate current (AC) power supply independently from the computer system.

23. The optical storage driving device as claimed in claim 14, further comprising:
 a power amplifier connected to the video/audio encoder/decoder to amplify decoded audio signals; and
 a speaker connected to the power amplifier to output amplified audio signals.

24. The optical storage driving device as claimed in claim 14, further comprising:
 a status display arranged to display an operation status of the memory card reader, said optical storage device and a basis input/output system (BIOS) of the computer system; and
 a display controller arranged to control a visual display of the status display.

* * * * *